Dec. 14, 1926.
J. F. McKEE ET AL
1,610,871
TRAP
Filed June 23, 1922
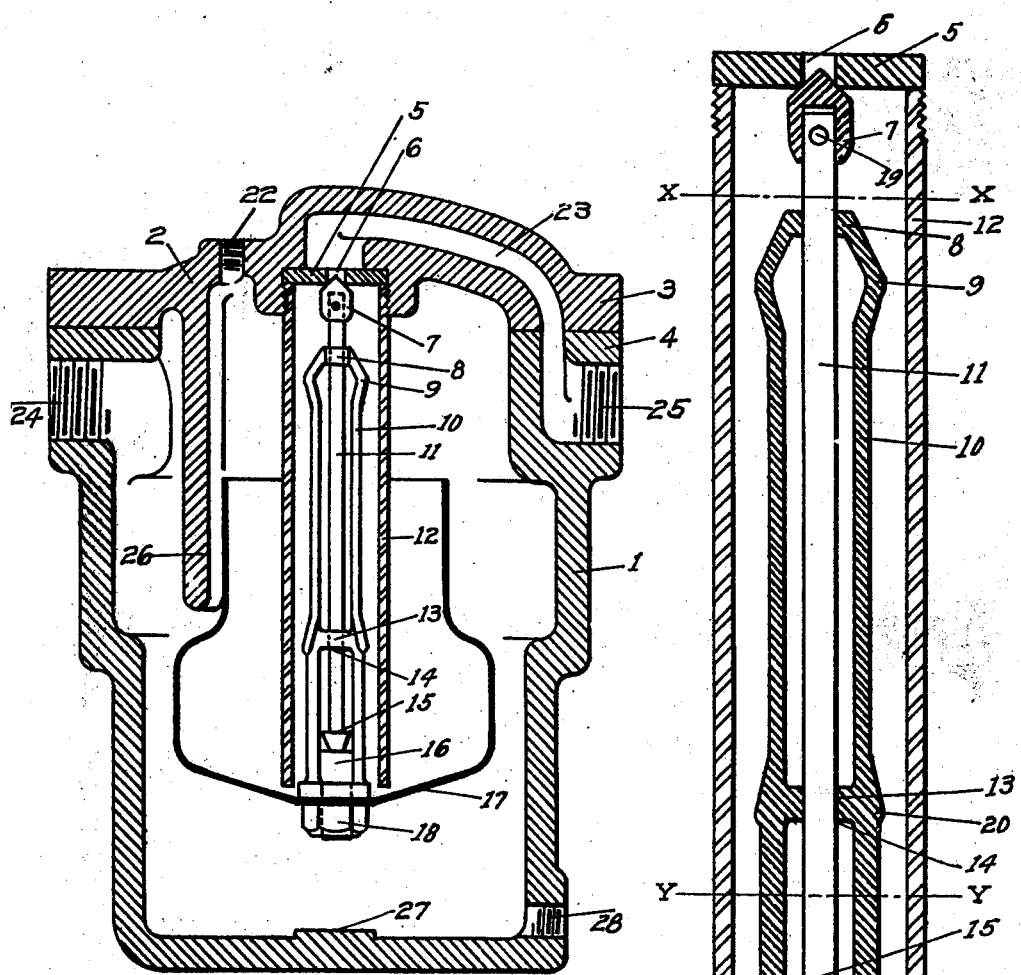
Fig. No. 1.
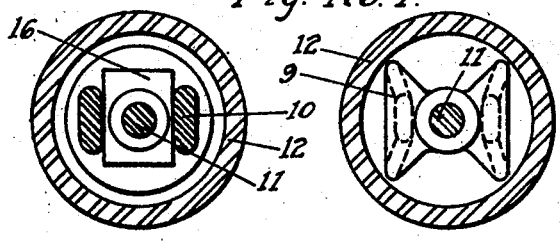
Section Y-Y.  Section X-X.
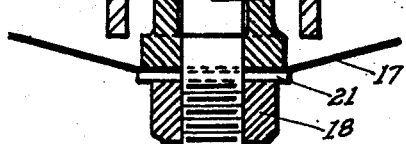
Fig. No. 2.
Witness
S. Stephens Mitchell
Inventors
Jno. F. McKee
Douglas B. Wright Patented Dec. 14, 1926.

1,610,871

UNITED STATES PATENT OFFICE.

JOHN F. McKEE AND DOUGLAS B. WRIGHT, OF ATLANTA, GEORGIA, ASSIGNORS TO ILLINOIS ENGINEERING COMPANY, OF CHICAGO, ILLINOIS, A CORPORATION OF ILLINOIS.

TRAP.

Application filed June 23, 1922. Serial No. 570,337.

Our invention relates to traps and more particularly refers to appliances for use with steam systems wherein the water of condensation is accumulated and automatically discharged.

The invention has specific reference to improvements in traps requiring the vertical movement of a valve stem or its equivalent, by an open vessel floating in water or other liquid, one of our objects being to increase the power and force exerted by the downward movement of said vessel upon the valve stem, to increase the capacity and utility of said appliance.

Another object is to increase the travels of the open vessel and mechanism operating therewith.

Particularly, as applied to traps for separating and discharging water or other liquid, another object is to exert a greater force on the valve operating mechanism, thus permitting the use of a larger valve opening, obtaining a maximum travel of the valve in order to eliminate the usual wire drawing and to provide a free opening during the discharge of the liquid.

In the drawings:

Fig. 1 is a cross sectional view of the trap chamber, with the trap in place therein.

Fig. 2 is an enlarged cross sectional view of the trap.

Sections X—X and Y—Y are cross sectional views taken on the respective lines X—X and Y—Y of Fig. 2.

Referring to the drawing, 1 designates the trap body, which may be circular in shape, to which is bolted or otherwise secured the top 2 through the flanges 3 and 4. Into the top portion 2 may be inserted a flat circular composition disc 5 acting as a valve seat, it being possible to reverse this disc using the other side as a new valve seat. The disc 5 is held in place by the hollow discharge conduit 12, which may be screw threaded into the top portion 2. 7 designates the valve which may be V-shaped or rounded in form, fastened to vertical valve stem 11 by a removable pin 19. The valve stem 11 slides in the skeleton guide 10, the latter also acting as a guide for the open ended float chamber 17, the guide 10 being itself guided in conduit 12 by outwardly flaring lugs 9 and 20 which may be cast integral with guide 10. The valve stem is adapted to move vertically in recesses 8 and 13 of guide 10. 17 is an open top bucket which may be of spun copper or the like. In the drawing, we have shown the bucket 17 and the valve mechanism in its uppermost position.

The operation of the trap is as follows: The liquid such as water of condensation enters through the inlet 24, and is deflected by the baffle plate 26, falls downwardly into the contracted lower portion of the trap chamber 1, the blowoff outlet 28 being closed. As the water accumulates in the trap casing 1, the bucket 17 being empty, rises to its uppermost position, as shown in the drawing. As the water continues to enter the trap chamber 1, it overflows into bucket 17, filling said bucket to a point where its buoyancy is neutralized. The water, continuing to enter sinks the bucket 17, pulling down with it, valve stem guide 10, the lower end of which is bolted to the bucket 17 by bolt 16 and nut 18. It will be seen that the speed of the descending bucket is accelerated by water flowing into it from the trap body 1. Valve 7 is, in the meantime, held to its seat 5 by the pressure in the chamber 1. Shoulder 14, cast integral with 10, descending with the bucket 17, strikes the upper face of shoulder 15, which shoulder 15 is formed integral with and forming the lower extremity of valve stem 11. The force and energy of this blow is assisted by the weight of the descending members 10, 17, 16 and 18, and this force may also be considered as due to the weight of water falling into bucket 17 from chamber 1 during the descent of the bucket. This force is sufficient to unseat valve 7 from valve seat 5 thereby allowing water to discharge out of bucket 17, through the vertical tube 12, through the orifice 6 in disc 5, and through the passageway 23 to the outlet 25 of the trap.

After the shoulder 14 contacts the shoulder 15, the bucket 17 and valve 7 continue their downward descent for a short distance until the base of the bolt 16 contacts the upper face 27 of the chamber 1. Valve 7 continues to fall until the lower face of shoulder 15 strikes the bolt 16. Bucket 17 and valve 7 are now at their lowest position, valve 7 being removed a considerable distance from the valve seat 5, which position will allow of a free discharge of water through orifice 6. All projections on parts located in the tube 12 are preferably given as near a stream line form as feasible, so that the velocity of the water will not tend, to any great extent, to lift these parts during the discharge cycle.

The weight of valve 7 and valve stem 11 is made sufficient, together with the stream line effects, so that they will remain down during the discharge cycle. As the water is discharged, the bucket gradually regains its buoyancy until it has again risen to its uppermost position, when valve 7 closes the orifice 6 and the discharge of water ceases. The bucket 17 is preferably designed to assist in accelerating the speed at which it rises or falls. To accomplish this result the bucket is preferably of a larger circumference at one point to provide a stored volume of water as shown, eliminating the necessity of waiting for the water to flow into the trap body through the inlet 24. We are aware that this same effect has, to a degree, been obtained by forming the sides of the bucket vertical or cylindrical and by enlarging the diameter of chamber 1 at the water lines, or by increasing the diameter of chamber 1.

In some types or sizes of this trap, we propose to use a design having practically vertical sides, but the most advantageous design for the particular use intended will readily appear to those skilled in the art.

The bottom of the bucket is given a slight slope downward toward the center, and has rounded edges so that the skin resistance of the bucket will be diminished, this tending to increase the speed of the bucket when descending. This design also gives the bucket greater rigidity. Only sufficient water remains in the bottom of the bucket to form a water seal at the lower end of tube 12. 21 is a washer for strengthening the bottom of the bucket. 22 is a tapped hole for an air discharge valve. 28 is a tapped opening for a blowout.

The object of the preferred shape of float chamber shown, is to allow for maximum buoyancy when partially submerged. It will be apparent that as the float chamber descends, there will be a gradually increasing downward force to unseat the valve. The valve stem and parts rigidly connected thereto are preferably of a sufficient weight to prevent lifting by impact action of the liquid discharged.

We are aware that there are traps in use having a trap body with a cover, central discharge tube and reversible valve seat, and provided with the usual inlet, outlet and baffle plate, to which construction, we make no claims of invention.

It may be pointed out that it is preferable to restrict the diameter of the bucket at substantially the height of the line of buoyancy.

We claim as our invention:

1. In a steam trap of the bucket type having a single valve, the combination with a bucket, of a guide member having an internal longitudinal opening movable with, attached to, and projecting upwardly within the bucket, a single valve and elongated valve stem loosely mounted for independent guided movement in said opening in the guide member and seating above the line of buoyancy of the bucket on a discharge port having direct communication with the trap outlet, means carried by the guide and projecting into said opening adapted to make contact with a head on the valve stem for actuating the single valve and valve stem after the bucket and guide have first had an independent movement, said valve being adapted to seat upwardly and unseat downwardly.

2. In a steam trap of the bucket type having a single valve, the combination with a bucket, said bucket being reduced in diameter above the line of buoyancy, of a guide member having an internal longitudinal opening movable with, attached to, and projecting upwardly within the bucket, a single valve and elongated valve stem loosely mounted for independent guided movement in said opening in the guide member and seating above the line of buoyancy of the bucket on a discharge port having direct communication with the trap outlet, means carried by the guide and projecting into said opening adapted to make contact with a head on the valve stem for actuating the single valve and valve stem after the bucket and guide have first had an independent movement, said valve being adapted to seat upwardly and unseat downwardly.

JNO. F. McKEE.
DOUGLAS B. WRIGHT.